(12) United States Patent
Kashihara et al.

(10) Patent No.: US 12,732,528 B2
(45) **Date of Patent: *Sep. 8, 2026**

(54) SYSTEMS AND METHODS FOR IMPROVED CYBERSECURITY NAMED-ENTITY-RECOGNITION CONSIDERING SEMANTIC SIMILARITY

(71) Applicants: Kazuaki Kashihara, Mesa, AZ (US); Jana Shakarian, Chandler, AZ (US)

(72) Inventors: Kazuaki Kashihara, Mesa, AZ (US); Jana Shakarian, Chandler, AZ (US)

(73) Assignees: Arizona Board of Regents on Behalf of Arizona State University, Tempe, AZ (US); Cyber Reconnaissance, Inc., Tempe, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/781,995

(22) Filed: Jul. 23, 2024

(65) Prior Publication Data

US 2025/0202922 A1 Jun. 19, 2025

Related U.S. Application Data

(63) Continuation of application No. 17/245,701, filed on Apr. 30, 2021, now Pat. No. 12,081,576.

(60) Provisional application No. 63/018,248, filed on Apr. 30, 2020.

(51) Int. Cl.

| | |
|---|---|
| ***H04L 9/40*** | (2022.01) |
| ***G06F 18/21*** | (2023.01) |
| ***G06F 18/213*** | (2023.01) |
| ***G06F 18/22*** | (2023.01) |
| ***G06F 21/12*** | (2013.01) |
| ***G06F 21/57*** | (2013.01) |
| ***G06F 40/295*** | (2020.01) |
| ***G06F 40/30*** | (2020.01) |
| *G06N 20/00* | (2019.01) |

(52) U.S. Cl.
CPC ........ *H04L 63/1433* (2013.01); *G06F 18/213* (2023.01); *G06F 18/217* (2023.01); *G06F 18/22* (2023.01); *G06F 21/128* (2013.01); *G06F 21/577* (2013.01); *G06F 40/295* (2020.01); *G06F 40/30* (2020.01); *G06N 20/00* (2019.01)

(58) Field of Classification Search
CPC . H04L 63/1433; G06F 18/213; G06F 18/217; G06F 18/22; G06F 21/128; G06F 21/577; G06F 40/295; G06F 40/30; G06N 20/00
See application file for complete search history.

(56) References Cited

U.S. PATENT DOCUMENTS

| | | | | |
|---|---|---|---|---|
| 2018/0130019 | A1* | 5/2018 | Kolb | G06F 16/9535 |
| 2018/0157681 | A1* | 6/2018 | Yang | G06F 16/538 |
| 2019/0222593 | A1* | 7/2019 | Craig | G06N 20/20 |
| 2020/0034362 | A1* | 1/2020 | Galitsky | G06F 40/247 |

(Continued)

*Primary Examiner* — Cheng-Feng Huang
(74) *Attorney, Agent, or Firm* — Polsinelli PC

(57) ABSTRACT

A computer-implemented system implements a named entity recognition (NER) model trained for automatic dataset labeling and corpus generation for cybersecurity entities. The NER model includes a semantic similarity measure to determine which category an unclassified/unlabeled word such as an ambiguous keyword with more than one meaning should belong to based on the semantic similarity of an entire sentence.

6 Claims, 4 Drawing Sheets

(56) References Cited

U.S. PATENT DOCUMENTS

2020/0174966 A1* 6/2020 Szczepanik ............. G06F 16/13
2021/0173874 A1* 6/2021 Giddings ............... G06N 20/00

* cited by examiner

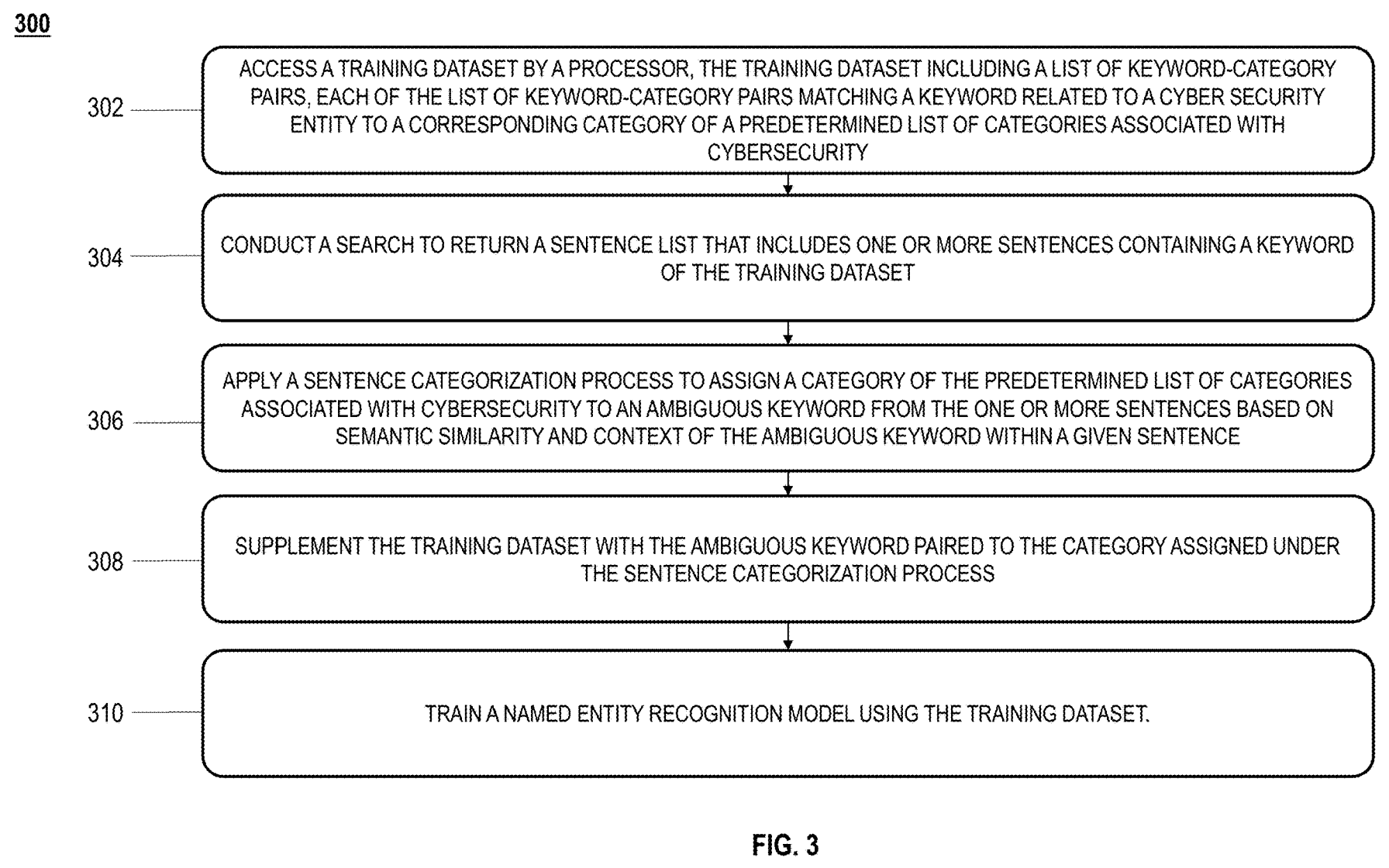

300

302 ACCESS A TRAINING DATASET BY A PROCESSOR, THE TRAINING DATASET INCLUDING A LIST OF KEYWORD-CATEGORY PAIRS, EACH OF THE LIST OF KEYWORD-CATEGORY PAIRS MATCHING A KEYWORD RELATED TO A CYBER SECURITY ENTITY TO A CORRESPONDING CATEGORY OF A PREDETERMINED LIST OF CATEGORIES ASSOCIATED WITH CYBERSECURITY

304 CONDUCT A SEARCH TO RETURN A SENTENCE LIST THAT INCLUDES ONE OR MORE SENTENCES CONTAINING A KEYWORD OF THE TRAINING DATASET

306 APPLY A SENTENCE CATEGORIZATION PROCESS TO ASSIGN A CATEGORY OF THE PREDETERMINED LIST OF CATEGORIES ASSOCIATED WITH CYBERSECURITY TO AN AMBIGUOUS KEYWORD FROM THE ONE OR MORE SENTENCES BASED ON SEMANTIC SIMILARITY AND CONTEXT OF THE AMBIGUOUS KEYWORD WITHIN A GIVEN SENTENCE

308 SUPPLEMENT THE TRAINING DATASET WITH THE AMBIGUOUS KEYWORD PAIRED TO THE CATEGORY ASSIGNED UNDER THE SENTENCE CATEGORIZATION PROCESS

310 TRAIN A NAMED ENTITY RECOGNITION MODEL USING THE TRAINING DATASET.

FIG. 3

SYSTEMS AND METHODS FOR IMPROVED CYBERSECURITY NAMED-ENTITY-RECOGNITION CONSIDERING SEMANTIC SIMILARITY

CROSS REFERENCE TO RELATED APPLICATIONS

The present application is a continuation of U.S. non-provisional application Ser. No. 17/245,701 filed on Apr. 30, 2021 that claims benefit to U.S. provisional patent application No. 63/018,248 filed on Apr. 30, 2020, which are incorporated by reference in their entirety.

FIELD

The present disclosure generally relates to named entity recognition (NER), and in particular, to system and method for generating an NER model for semi-automatic labeling and corpus generation for cybersecurity entities.

BACKGROUND

Timely analysis or extraction of cybersecurity information from unstructured text such as incident reports, news sites, and blogs is vital for many types of applications. One important application is the conversion of unstructured cyber-security information to a more structured form such as ontology. For instance, knowledge modeling of cyber-attacks simplifies the work of auditors and analysts who use structured data to extract training data for learning models. The key of the information extraction from unstructured cybersecurity information is the recognition of named entities of cybersecurity related domains. The current Named Entity Recognition (NER) tools that show state-of-the-art performance in the field are based on feature engineering.

Feature engineering has several limitations. The major issues are: it relies heavily on the experience of the person and the lengthy trial and error process that accompanies that, and it also relies on look-ups or dictionaries to identify known entities. These dictionaries are hard to build and harder to maintain especially with highly dynamic fields, such as cybersecurity. These activities constitute the majority of the time needed to construct these NER tools. In addition, these tools are domain specific and do not achieve good accuracy when applied to other domains. However, the requirement of the available features to the training and test data will not only slow down the annotation process, but also diminish the quality of results. Feature set selection for cybersecurity entities and concept spotter engine have been carried out manually by analyzing the text and checking which features would be suitable. The result shows that a tool designed to recognize entities well in the biochemistry field performs very poorly in the domain of cybersecurity. The BRAT rapid annotation system is a system to annotate the customized training dataset from the given text. The simple typed text span category of the BRAT rapid annotation system is suitable for creating annotations for Named Entity Recognition; however, this rapid annotation system still requires great manual effort since in some cases the text span is correct, but the category may be incorrect, and therefore a check and manual correction are required.

It is with these observations in mind, among others, that various aspects of the present disclosure were conceived and developed.

BRIEF DESCRIPTION OF THE DRAWINGS

FIG. 3 a simplified block diagram of a possible process/method associated with the system of FIGS. 1 and 2 for improved cybersecurity named entity recognition.

Corresponding reference characters indicate corresponding elements among the view of the drawings. The headings used in the figures do not limit the scope of the claims.

DETAILED DESCRIPTION

Aspects of the present disclosure relate to embodiments of a computer-implemented system for generating and implementing a named entity recognition (NER) model trained and suitable for automatic dataset labeling and corpus generation for cybersecurity entities, including associated methods, as described herein. In some embodiments, the NER model includes a semantic similarity measure to determine which category an unclassified/unlabeled word should belong to based on the semantic similarity of an entire sentence. The NER model described herein and associated methods is particularly advantageous for finding and categorizing undiscovered keywords for given cybersecurity categories.

Figure 1:
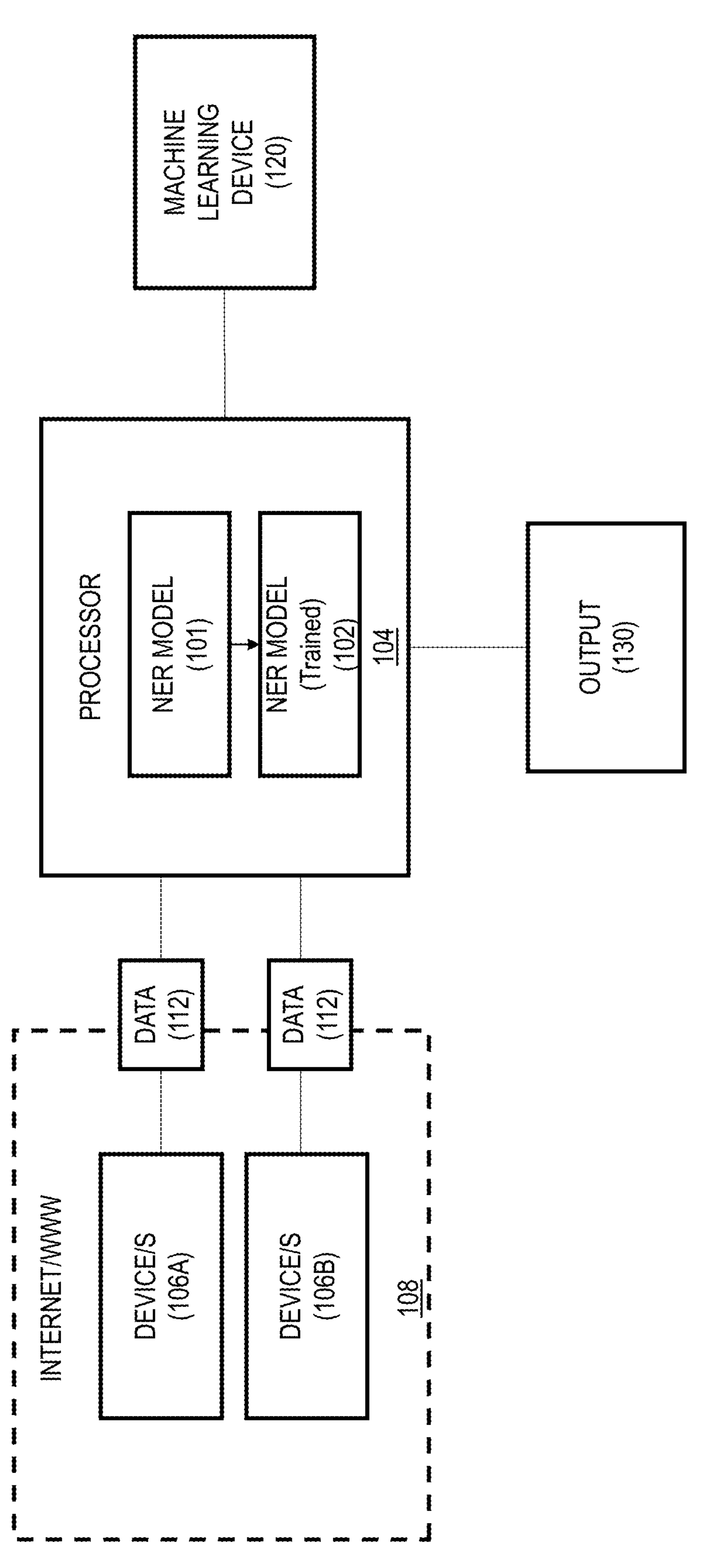
FIG. 1 is a network diagram illustrating possible devices and components supporting the system of FIG. 2.

Referring to FIG. 1, a network 100 of devices and components is illustrated for generating and implementing a trained NER model 102 (based on an original NER model 101 or otherwise), as further described herein. In some embodiments, the network 100 includes a processor 104 that trains a first or original/base NER model to form a second or trained NER model 102 based on the NER model 101. The processor 104 is in operable communication with one or more devices 106 (designated device 106A and device 106B) of the general Internet or World Wide Web 108, so that the processor 104 can access data 110 (via scraping, crawling, or otherwise) defining any information about cybersecurity entities and associated categories from such devices 106, including citations of predetermined entities, or any information leveraged to train the NER model 102 as described by FIG. 2, and the like. Devices 106 include any number or type of computing devices in any form including computing devices, servers, cloud devices, or other such devices or providing access to the data 110. In some embodiments, the processor 104 may further access the data 110 from one or more devices of the deep or dark web. As further shown, the processor 104 may further be in communication with any number of computing devices that provide tools or resources for machine learning (120). For example, machine learning 120 may represent a device providing, via an application programming interface (API) or otherwise, access to specific machine learning resources such as various algorithms, training datasets, black box systems, and the like.

In general, the NER model 102 may be generated and/or implemented by at least one of the processor 104; which may be implemented via one or more computing devices, and may include any number of suitable processing elements. The NER model 102 may further define or be embodied as code and/or machine-executable instructions executable by the processor 104 that may represent one or more of a procedure, a function, a subprogram, a program, a routine, a subroutine, a module, an object, a software package, a class, or any combination of instructions, data structures, or program statements, and the like. In other words, aspects of the NER model 102 described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) of the NER mode 102 may be stored in a computer-readable or machine-readable medium (e.g., main memory 1204 of FIG. 4), and the processor 104 performs the tasks defined by the code. As such, the NER model 102 configures the processor 104 for automatic dataset labeling and corpus generation for cybersecurity entities, as further described herein.

As further shown in FIG. 1, the processor 104 implementing aspects of the NER model 102, generates an output 130, which includes, e.g., a prediction, classification, or determination related to undiscovered keywords for given cybersecurity categories. In other words, the output 130 includes any intelligence or output data defining which predetermined category an undiscovered word should belong to. Accordingly, the output 130 provided is useful for categorizing cybersecurity entities relating to words that are ambiguous, have multiple meanings, or are otherwise difficult to interpret for whatever reason.

Figure 2:
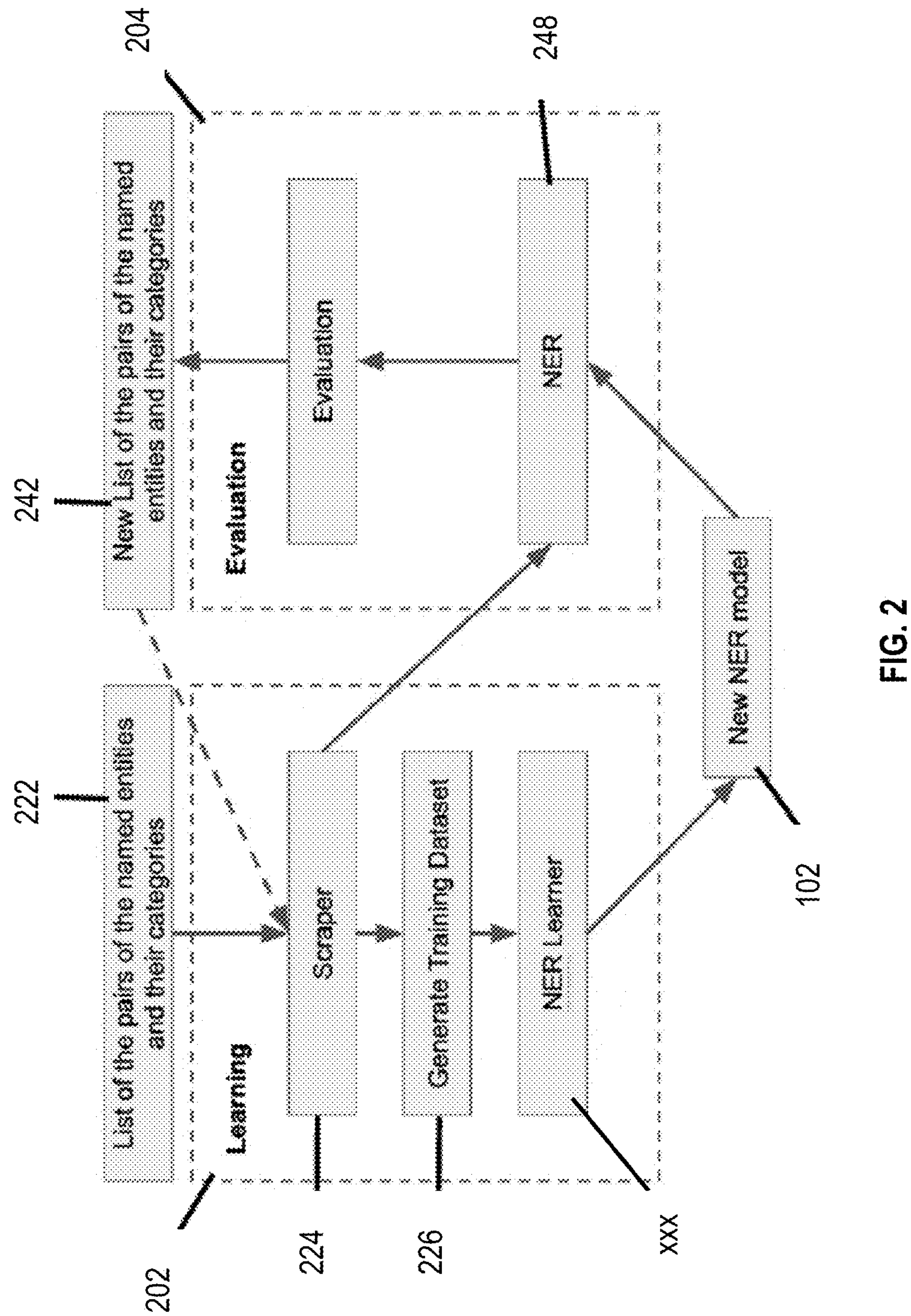
FIG. 2 is a flowchart showing data flow and a general architecture of a system for automatic dataset labeling and corpus generation that may utilize one or more components of the network of FIG. 1.

Referring to FIG. 2 and FIG. 3, a system, hereinafter "system 200", and an associated process 300 are illustrated as one possible embodiment that leverages one or more components of FIG. 1 to generate and implement the NER model 102 of FIG. 1. In general, the system 200 includes two parts: a learning process 202, and an evaluation process 204. The learning process 202 includes a list 222 of pairs of a set of cybersecurity entities and their respective categories. With the list 222, a scraper 224 is operable for extracting a plurality of sentences from online incident reports and cybersecurity news articles that include one of the cybersecurity entities, and annotating the cybersecurity entities in the sentences with their categories to generate the training corpora, as shown in block 226. Some entities are ambiguous since a word or phrase relating to the same may have multiple meanings. A semantic similarity measurement is introduced and determines which category the word belongs to based on the semantic similarity of the entire sentence. Then, the named entity recognition (NER) model 101 of FIG. 1 is trained with the training corpora. Since the training corpora from block 226 may contain noise, the evaluation process 204 checks the learned NER model 102 with the sentences that are collected through the evaluation process 204 to examine the learned NER model 102. The user(s) can check the extracted entities with their categories one by one, then add the pair of the entity and its category, if the pair of entity and category is correct. A list 242 of new pairs may be passed to the learning process (202).

In some embodiments, the system 200 is evaluated with three new and different cybersecurity related corpora; training the NER model 102 for software and games, training the NER model 102 for malware, Advanced Persistent Threat (APT) Group, and Exploit Kit (EK), and training as well as for botnet, ransomware, APT Group and EK. Evaluation (204) results show that the performance improves after each iteration, especially the system 200 with semantic similarity measurement for ambiguous keywords.

A bootstrapping method may further be included to train the NER model 101 for cybersecurity domain entity types including product name, attack name, malware name, and hacker group name. In addition, the semantic similarity measurement may be introduced for solving ambiguous entities cases. This semantic similarity measurement helps to determine which category an ambiguous entity should belong to. Experiments were empirically conducted on two datasets. The experimental results demonstrate the system 200 performs better after each iteration and the semantic similarity measurement helps to annotate ambiguous keywords correctly.

Detailed Overview of System 200

In this section, a more detailed description of the system 200 is presented, comprising as described, two parts which are inter-dependent: the (1) learning process 202; and the (2) evaluation process 204.

Learning Process (202)

The learning process 202 is fully automated (and executable by the processor 104) to generate the training data of the cybersecurity related tags for the customized NER model 102. The algorithm of the learning process 202 is shown as Algorithm 1 below, and is generally described in blocks 302, 304, 306, 308, and 310 of process 300 in FIG. 3. In some embodiments, the learning process 202 utilizes the list 222 of the pairs of keyword (named entity) and its category as input. Cybersecurity incident reports and professionals' articles published online containing the keywords associated with cybersecurity entities are labeled and the paired categories are assigned. Then, a scraper function 224 searches and extracts the incident reports that include one of the keywords, and returns a list of the sentences that contain the keyword from the reports. The scraper algorithm 224 is shown as Algorithm 2 below. In addition, some keywords have multiple meanings and they are ambiguous since they belong to multiple categories. In Algorithm 3 further shown below, SentCat (sentence categorization) is introduced to decide to which category the ambiguous keyword is assigned in the given sentence based on semantic similarity of the category and the context. SentCat is described in greater detail in the next subsection.

Handling Ambiguous Meaning

Many keywords' meaning changes with the context. For instance, "Microsoft has released a security update to address an elevation of privilege vulnerability (CVE-2019-1162) in windows" and "an inventory of the network analysis classes for which you can set time windows". The "windows" in the first sentence means the operating system but the second one means the window of time. To avoid mislabeling, the semantic similarity of the sentence is introduced between ambiguous categories.

Let $S=w_1w_2 \ldots w_n$ be a sentence that has n words ($w_i$ is ith word in the sentence where $1 \le i \le n$), and $Nouns=(n_1, \ldots, n_k)$ be a set of nouns in the sentence S (k is the number of nouns in the sentence S and $k \le n$). A set Pis given that has the pairs of ambiguous keywords and their categories $P=((x_1, C_1), \ldots, (x_m, C_m))$, where $x_i$ is th keyword and $C_j$ is the set of jth keyword's categories $C_j=(c_1, \ldots, c_l)$ where $1 \le j \le l$.

| Algorithm 1 LearningProcess(TrainList) | |
|---|---|
| 1: | TrainSentList = { } |
| 2: | for keywordPair ∈ TrainList do |
| 3: | SentenceList = { } |
| 4: | keywordPair is a pair of keyword and its categoryList (Category List). |
| 5: | SentenceList add Scraper(keyword) |
| 6: | for sentence ∈ SentenceList do |
| 7: | if ‖ categoryList ‖ ≥2 and keyword appears in sentence then |
| 8: | highestCat = SentCat(sentence, keyword, categoryList) |
| 9: | if highestCat is one of the categories we annotate then |
| 10: | TrainSentList add (sentence, keyword, highestCat) |
| 11: | end if |
| 12: | else if keyword appears in sentence then |
| 13: | category = categoryList |
| 14: | TrainSentList add (sentence, keyword, category) |
| 15: | end if |
| 16: | end for |
| 17: | end for |
| 18: | Train NERModel with TrainSentList |

| Algorithm 2 Scraper(keyword) | |
|---|---|
| 1: | SentenceList = { } |
| 2: | siteList is the list of cybersecurity professionals' sites |
| 3: | for site ∈ siteList do |
| 4: | reportLinks = the incident report links in site that contain Keyword |
| 5: | for link ∈ reportLinks do |
| 6: | Extract all sentences in the report from link |
| 7: | SentenceList add the extracted sentences |
| 8: | end for |
| 9: | end for |
| 10: | return SentenceList |

The similarity score of a word $w_i$ and the category $c_j$ is defined as $Sim(w_1, c_j)$ and its range is [0,1]. Then, the semantic similarity score of the sentence S that contains an ambiguous keyword $x_i$ with the category $c_j \in C_i$ is defined as $$SemSim(S, x_i, c_j) = \frac{\sum_{a=1}^{k} Sim(n_a, c_j)}{k} \tag{1}$$

If the ambiguous keyword $x_i$ appears in the sentence S, the NER category $c \in C_i$ is determined by SentCat as follows:

$$\text{SentCat}(S, x_i, c) = \max_{c \in C_i} SemSim(S, x_i, c) \tag{2}$$

The steps of SentCat are described in Algorithm 3 (below).

| Algorithm 3 SentCat(sentence, keyword, categoryList) | |
|---|---|
| 1: | highestCategory = "" |
| 2: | highestSimScore = 0 |
| 3: | for category ∈ categoryList do |
| 4: | nounList is the list of all nouns and noun phrases in the sentence |
| 5: | simScore = 0 |
| 6: | for noun ∈ nounList do |
| 7: | simScore+ = Sim(noun, category) |
| 8: | end for |
| 9: | $simScore = \frac{simScore}{\|nounList\|}$ |
| 10: | if simScore ≥ highestSimScore then |
| 11: | highestSimScore = simScore |
| 12: | highestCategory = category |
| 13: | end if |
| 14: | end for |
| 15: | return highestCategory |

Evaluation Process (204)

Algorithm 4 (below) shows how the evaluation process 204 processes the sentences collected from the scraper 224 in the learning process 202 to tag the named entities with the newly learned NER model 102. After that, the extracted named entities may be examined by users. The words and noun phrases with their categories that the user selected are added to the exported list 242, and the list 242 is passed back to the learning process 202 for further training/learning or otherwise.

The evaluation process 204 of the system 200 is qualitative and may involve manual evaluation and annotation of the sentences, and applied entity-category-pairs in the training set. For example, if the user approved that the pair of the named entity and its category is correct, then that pair is added to the new training list 242. After checking all pairs, the new train list is passed to the learning process 202. It helps to increase the number of ground truth sentences that contain one of the named entities in the new training list 242 to generate more accurate and larger training corpora. For instance, the NER model 102 is trained to detect names of software annotates "tor browser" and "libreoffice" in the following sentence "the hunspell dictionaries are used for spell-checking by tor browser, libreoffice, thunderbird, and many other applications." If the names are not listed in the training keyword list 222 and the user confirms that these words are software entities, the names may be added to the new train list 242. On the other hand, if the learned NER model 102 annotates "splatterhouse" as "Software" entities in the following sentence "spiritual heir of the splatterhouse.", the annotation is considered incorrect, such that the word may be absent/removed from the new training list 242. After checking all pairs, the new training list 242 is passed to the learning process 202 to increase the ground truth sentences that contain one of the named entities in the new training list 242 to generate more accurate and larger training corpora.

| Algorithm 4 Evaluation(NERModel, SentList) |
|---|

```
1:  NewTrainList = { }
2:  for sentence ∈ SentList do
3:      namedEntityPairList = all pairs of named entities
        and their categories in
        sentence with NERModel
4:      for namedEntity and category ∈ namedEntityPairList do
5:          if user confirms the pair of namedEntity and category
            is correct then
6:              NewTrainList add (namedEntity, category)
7:          end if
8:      end for
9:  end for
10: return NewTrainList
```

Experimental Evaluation

The system 200 was evaluated with three corpora; Software-Game corpus, Malware-APT Group-Exploit Kit corpus, and Botnet-Ransomware-APT Group-ExploitKit corpus.

Data

Software-Game corpus data was obtained from a cyber-threat reconnaissance firm (called CYR3CON), and contains 359,329 sentences of real-world cyber threat conversations. Malware-APT Group-Exploit Kit corpus and Botnet-Ransomware-APT Group-Exploit Kit have 3,089 sentences from the cybersecurity incident reports and the specialists' articles from eight major cybersecurity firms and websites: Symantec, FireEye, Palo Alto Network, Crowd Strike, Rapid7, Security Week, Secure List, and Security Intelligence. These sentences contain at least one of the following keywords under the three categories; Malware, APT Group, and Exploit Kit (EK): "Mirai" and "WannaCry" for Malware, "EternalBlue" for EK, and "APT1" and "APT29" for APT Group. Botnet-Ransomware-APT Group-Exploit Kit corpus splits the "Malware" category from Malware-APT Group-Exploit Kit corpus into "Botnet" and "Ransomware" and removed other types under "Malware".

For the evaluation, the sentences that contain at least one keyword of any category were split into two groups, one for training and another for evaluation, for both corpora. An open-source software library "spaCy" was used for calculating Sim and NER model (102) training. Since spaCy's word similarity score is in the range [−1, 1], the range was adjusted to [0, 1]. For evaluating in the closed environment, the scraper feature 224 was not used in the learning process and only the sentences in each corpus were used.

For evaluating the performance, the sentences that contain at least one of the keywords in the training list 222/242 were selected.

TABLE 1

The statistics of Software-Game Corpus.

| | Our Method | | | | Our Method with SentCat | | | | |
|---|---|---|---|---|---|---|---|---|---|
| | # of Sent | | Train List Size | | # of Sent | | Train List Size | | |
| | Train | Eval | Soft | Game | Train | Eval | Soft | Game | Amb |
| 1 | 503 | 503 | 401 | 702 | 450 | 450 | 374 | 664 | 65 |
| 2 | 523 | 523 | 415 | 719 | 510 | 510 | 388 | 678 | 65 |
| 3 | 535 | 535 | 428 | 727 | 554 | 554 | 416 | 689 | 66 |
| 4 | 594 | 594 | 462 | 743 | 836 | 836 | 435 | 702 | 66 |
| 5 | 619 | 619 | 471 | 751 | 882 | 882 | 517 | 709 | 75 |
| 6 | 923 | 923 | 499 | 756 | 1127 | 1127 | 560 | 721 | 84 |
| 7 | 943 | 943 | 563 | 763 | 1147 | 1147 | 576 | 729 | 91 |

The statistics of Software-Game Corpus. It shows the number of sentences in Training and Evaluation, and the size of each category's dictionary: Software, Game, and Ambiguous.

Results

Table 1 (above), and Table 2 and Table 3 (below) show the statistics of each corpus. The experimentation process did not use all of the sentences in the corpus in each iteration, since not all of them include the keywords that the learned model identified or was given.

For Software-Game corpus, the initial keywords were prepared as following: 401 Software keywords and 702 Game keywords for evaluating the system 200 without SentCat; and 374 Software keywords, 664 Game keywords, and 65 ambiguous keywords for evaluating the system 200 with SentCat. For Malware-APT Group-Exploit Kit corpus, the initial keywords were prepared as following: 6 Malware Keywords, 8 APT Group Keywords and 13 EK keywords for evaluating the system 200 without SentCat; and 6 Malware keywords, 7 APT Group keywords, 6 EK keywords, and 9 ambiguous keywords for evaluating the system 200 with SentCat.

In the evaluation with Software-Game corpus, the evaluation results are shown in Table 4 below. In the initial iteration, the system 100 implementing the NER model 102 found 503 sentences without SentCat, and per iteration increased on average by 73.33 sentences, 27 Software keywords, and 10.17 Game keywords. In addition, the system 200 with SentCat found 450 sentences in the initial iteration, and per iteration increased on average by 116.17 sentences, 33.67 Software keywords, 10.83 Game keywords, and 4.33 ambiguous keywords per iteration.

In the Malware-APT Group-Exploit Kit corpus, the evaluation results are shown in Table 5 below. In the initial iteration, the system 200 found 1,001 sentences without SentCat, which increased on average by 1.22 sentences, 0.33 Malware keywords, 0.33 APT Group keywords, and 0.78 EK keywords per iteration. The system 200 with SentCat found 955 sentences in the initial iteration, and increased on average by 5.33 sentences, 0.33 Malware keywords, 0.67 APT Group keywords 0.33 EK keywords, and 0.11 ambiguity keywords per iteration.

TABLE 2

| Statistics of Malware-APT Group-Exploit Kit Corpus | | | | | | | | | | | |
|---|---|---|---|---|---|---|---|---|---|---|---|
| | Our Method | | | | | Our Method with SentCat | | | | | |
| | # of Sent | | Train List Size | | | # of Sent | | Train List Size | | | |
| | Train | Eval | APT | EK | Malware | Train | Eval | APT | EK | Malware | Amb |
| 1 | 1001 | 1001 | 8 | 13 | 6 | 955 | 955 | 7 | 6 | 6 | 9 |
| 2 | 1009 | 1009 | 9 | 16 | 7 | 955 | 955 | 7 | 6 | 7 | 9 |
| 3 | 1009 | 1009 | 9 | 17 | 7 | 955 | 955 | 7 | 8 | 7 | 9 |
| 4 | 1011 | 1011 | 10 | 18 | 8 | 955 | 955 | 7 | 8 | 8 | 9 |
| 5 | 1011 | 1011 | 10 | 18 | 8 | 958 | 958 | 8 | 8 | 8 | 9 |
| 6 | 1011 | 1011 | 10 | 18 | 8 | 1003 | 1003 | 13 | 8 | 8 | 9 |
| 7 | 1011 | 1011 | 11 | 18 | 8 | 1003 | 1003 | 13 | 8 | 9 | 9 |
| 8 | 1011 | 1011 | 11 | 19 | 8 | 1003 | 1003 | 13 | 9 | 9 | 10 |
| 9 | 1012 | 1012 | 11 | 20 | 8 | 1003 | 1003 | 13 | 9 | 9 | 10 |
| 10 | 1012 | 1012 | 11 | 20 | 9 | 1003 | 1003 | 13 | 9 | 9 | 10 |

The statistics of Malware-APT Group-Exploit Kit corpus. It shows the number of sentences in Training and Evaluation, and the size of each category's dictionary: APT Group, Exploit Kit, Malware, and Ambiguous.

TABLE 3

| Statistics of Botnet-Ransomware-APT Group-Exploit Kit Corpus | | | | | | | | | | | | | |
|---|---|---|---|---|---|---|---|---|---|---|---|---|---|
| | Our Method | | | | | | Our Method with SentCat | | | | | | |
| | # of Sent | | Train List Size | | | | # of Sent | | Train List Size | | | | |
| | Train | Eval | Botnet | Ransom | APTG | EK | Train | Eval | Botnet | Random | APTG | EK | Amb |
| 1 | 1045 | 1045 | 8 | 7 | 7 | 4 | 936 | 936 | 7 | 6 | 4 | 4 | 5 |
| 2 | 1051 | 1051 | 9 | 8 | 7 | 4 | 938 | 938 | 8 | 7 | 4 | 4 | 5 |
| 3 | 1061 | 1061 | 12 | 8 | 8 | 5 | 938 | 938 | 8 | 7 | 4 | 4 | 5 |
| 4 | 1064 | 1064 | 13 | 8 | 8 | 5 | 941 | 941 | 10 | 7 | 4 | 4 | 5 |
| 5 | 1068 | 1068 | 14 | 9 | 8 | 6 | 941 | 941 | 10 | 7 | 4 | 5 | 5 |

The statistics of Botnet-Ransomware-APT Group-Exploit Kit corpus. It shows the number of sentences in Training and Evaluation, and the size of each category's dictionary: Botnet, Ransomware (Ransom), APT Group. Exploit Kit, and Ambiguous.

In the Botnet-Ransomware-APT Group-Exploit Kit corpus, the evaluation results are shown in Table 6 below. In the initial iteration, the system 200 found 1,045 sentences without SentCat, which increased on average by 5.75 sentences, 0.25 Botnet keywords, 0.5 Ransomware keywords, 1.5 APT Group keywords, and 0.5 EK keywords per iteration. The system 200 with SentCat found 936 sentences in the initial iteration, and increased on average by 1.25 sentences, 0 Botnet keywords, 0.25 Ransomware keywords, 0.75 APT Group keywords, 0.25 EK keywords, and 0 ambiguity keywords per iteration.

TABLE 4

| Result of the evaluation our method with the Software-Game corpus<br>F1 score of each category | | | | | | |
|---|---|---|---|---|---|---|
| | Our Method | | | Our Method with SentCat | | |
| Iteration | Total | Software | Game | Total | Software | Game |
| 1 | 77.08 | 84.09 | 70.78 | 70.23 | 81.87 | 55.53 |
| 2 | 78.59 | 88.81 | 65.89 | 72.44 | 83.16 | 58.51 |
| 3 | 78.70 | 84.72 | 71.96 | 75.21 | 81.62 | 66.19 |
| 4 | 82.38 | 89.51 | 73.70 | 74.71 | 84.10 | 66.20 |
| 5 | 80.79 | 87.12 | 72.06 | 79.78 | 84.81 | 73.66 |
| 6 | 79.37 | 92.08 | 61.45 | 81.99 | 86.66 | 76.30 |
| 7 | 82.74 | 90.58 | 71.50 | 82.63 | 86.91 | 77.94 |

TABLE 5

Result of the evaluation our method with the Malware-APT Group-Exploit Kit corpus F1 score of each category

| | Our Method | | | | Our Method with SentCat | | | |
|---|---|---|---|---|---|---|---|---|
| | Total | Malware | APTG | EK | Total | Malware | APTG | EK |
| 1 | 97.44 | 97.95 | 96.62 | 95.29 | 96.62 | 96.87 | 95.89 | 95.84 |
| 2 | 97.57 | 97.96 | 95.11 | 97.24 | 96.87 | 97.02 | 96.22 | 96.57 |
| 3 | 97.02 | 97.01 | 96.69 | 97.27 | 96.52 | 96.88 | 95.10 | 95.63 |
| 4 | 97.52 | 97.86 | 94.16 | 98.06 | 96.42 | 96.92 | 93.33 | 96.10 |
| 5 | 97.70 | 98.10 | 94.16 | 98.06 | 96.59 | 96.75 | 93.38 | 97.80 |
| 6 | 97.59 | 98.10 | 93.85 | 97.64 | 97.16 | 97.19 | 98.14 | 96.30 |
| 7 | 97.59 | 97.83 | 95.18 | 98.06 | 97.04 | 96.85 | 98.94 | 96.47 |
| 8 | 97.50 | 97.70 | 95.48 | 97.85 | 97.13 | 97.20 | 97.37 | 96.65 |
| 9 | 97.63 | 97.96 | 94.60 | 98.06 | 97.26 | 97.11 | 98.14 | 97.23 |
| 10 | 97.29 | 97.64 | 93.89 | 97.84 | 97.27 | 97.26 | 98.14 | 96.65 |

TABLE 6

Result of the evaluation our method with the Botnet-Ransomware-APT Group-Exploit Kit corpus F1 score of each category

| | Our Method | | | | | Our Method with SentCat | | | | |
|---|---|---|---|---|---|---|---|---|---|---|
| | Total | Botnet | Ransom | APTG | EK | Total | Botnet | Ransom | APTG | EK |
| 1 | 97.60 | 98.82 | 96.94 | 95.88 | 95.13 | 97.32 | 95.47 | 96.61 | 98.56 | 97.25 |
| 2 | 97.47 | 97.93 | 95.13 | 97.45 | 96.93 | 98.27 | 97.82 | 98.26 | 98.13 | 96.92 |
| 3 | 98.03 | 99.08 | 96.56 | 88.95 | 98.96 | 97.67 | 97.44 | 97.21 | 97.66 | 94.78 |
| 4 | 98.35 | 99.52 | 97.86 | 96.02 | 96.18 | 97.28 | 96.49 | 95.97 | 99.15 | 97.10 |
| 5 | 98.01 | 98.41 | 96.85 | 97.11 | 98.54 | 96.98 | 96.50 | 94.80 | 99.15 | 97.10 |

The experiment shows that the system 200 implementing the NER model 102 with and without SentCat perform almost similar F1 scores even if the system 200 with SentCat can collect more sentences with more keywords after the initial iteration. SentCat can remove some unrelated sentences with the ambiguous keywords. For instance, "Oslo" is a city in Norway but "OSLO" is Optics Software for Layout and Optimization. "Oslo" was registered as an ambiguous keyword with two categories, the SentCat returns "software" or "city". Therefore, the sample sentence: "discover 27 Scandinavian cities including Stockholm, Malm, Goteborg, Oslo, Stavanger, Bergen, Kobenhavn, Aalborg and Esbjerg", is assigned the "city" category since SemSim with "city" is higher than SemSim with "software".

The system 200 was trained based on the English model but SentCat works on other languages such as Spanish and Russian sentences as well. For instance, the NER model 102 can annotate "Windows" in some Russian and Chinese sentences as "software" correctly:

это бесплатный инструмент с открытым исходным кодом дляwindows, ко- торый сканирует каналы каналы сети wi-fi (translation: "it is a free open source tool for windows that scans wi-fi network channels"), and 以前常常用bbedit 進行windows 字 幕文件編碼格式轉換。

(translation: "in the past, bbedit was often used to convert the windows subtitle file encoding format"). However, it was also found that some sentences are judged incorrectly by category through SentCat. For example, "windows" in the sentence: "office 2016 for windows: mathtype 6", is categorized as "building" instead of "software". It is assumed that the sentence is just noun phrase case or the length is short to have the semantic information, it is possible to judge the wrong category through SentCat.

Conclusion

The present disclosure discusses a system 200 for training an NER model 102 for automatic annotation and corpus generation. SentCat was introduced to calculate the semantic similarity of the given keyword's category and the sentence that include the keyword to minimize the wrong annotation of ambiguous keywords. The experimental evaluation with three different corpora shows that the present system 200 performs well after iterating the process, and the system 200 with SentCat can find more undiscovered keywords and useful training sentences that contain keywords.

Exemplary Computing Device

Figure 4:
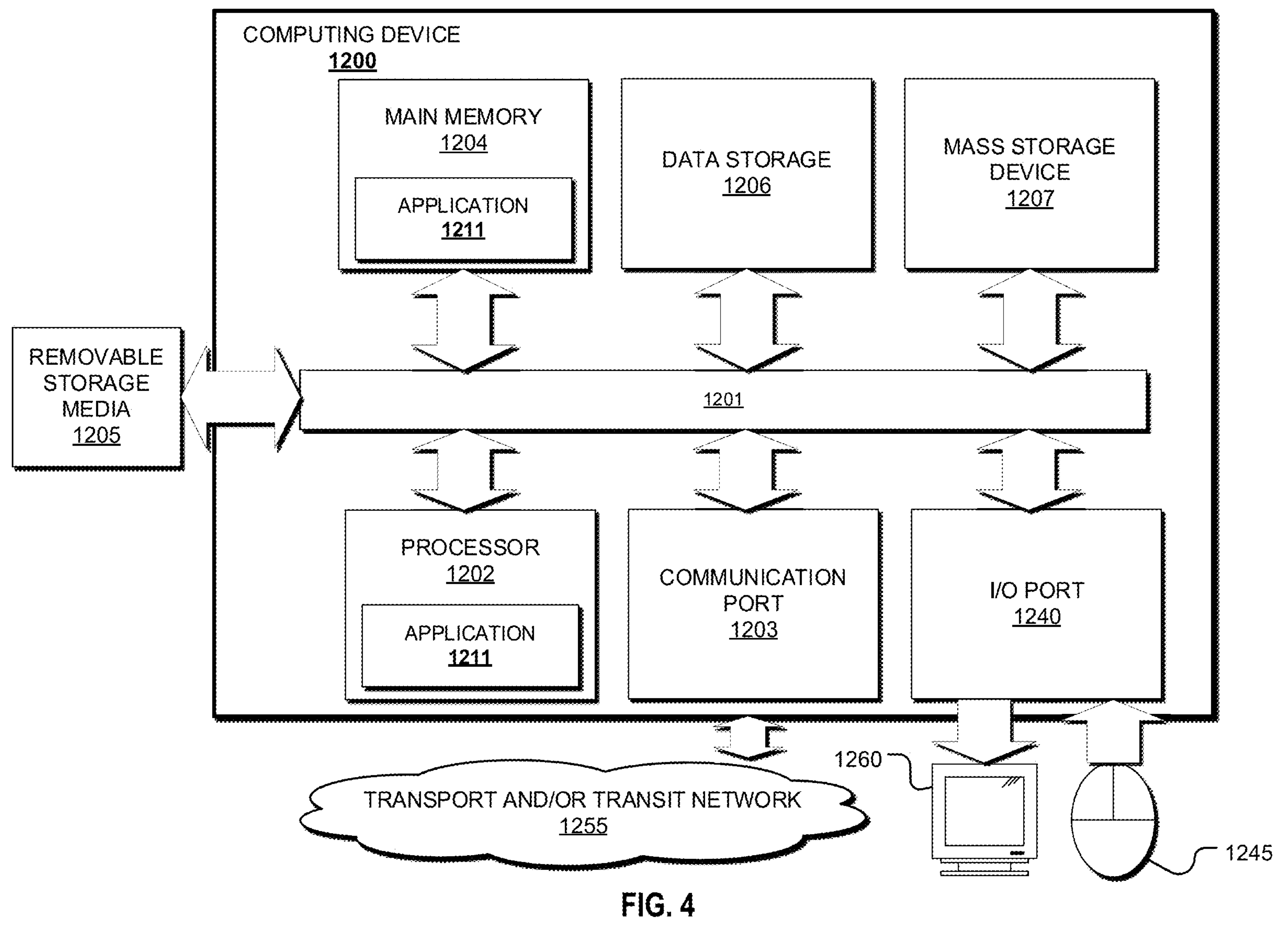
FIG. 4 is an exemplary simplified diagram of a computing device that may be configured to implement various methodologies described herein.

Referring to FIG. 4, a computing device 1200 which may be configured, via one or more of an application 1211 or computer-executable instructions, to execute functionality described herein. More particularly, in some embodiments, aspects of the system 200 and/or the NER model 102 herein may be translated to software or machine-level code, which may be installed to and/or executed by the computing device 1200 such that the computing device 1200 is configured to execute functionality described herein. It is contemplated that the computing device 1200 may include any number of devices, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments, and the like.

The computing device 1200 may include various hardware components, such as a processor 1202, a main memory 1204 (e.g., a system memory), and a system bus 1201 that couples various components of the computing device 1200 to the processor 1202. The system bus 1201 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 1200 may further include a variety of memory devices and computer-readable media 1207 that includes removable/non-removable media and volatile/non-volatile media and/or tangible media, but excludes transitory propagated signals. Computer-readable media 1207 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computing device 1200. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 1204 includes computer storage media in the form of volatile/nonvolatile memory such as read only memory (ROM) and random access memory (RAM). A basic input/output system (BIOS), containing the basic routines that help to transfer information between elements within the computing device 1200 (e.g., during start-up) is typically stored in ROM. RAM typically contains data and/or program modules that are immediately accessible to and/or presently being operated on by processor 1202. Further, data storage 1206 in the form of Read-Only Memory (ROM) or otherwise may store an operating system, application programs, and other program modules and program data.

The data storage 1206 may also include other removable/non-removable, volatile/nonvolatile computer storage media. For example, the data storage 1206 may be: a hard disk drive that reads from or writes to non-removable, nonvolatile magnetic media; a magnetic disk drive that reads from or writes to a removable, nonvolatile magnetic disk; a solid state drive; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules, and other data for the computing device 1200.

A user may enter commands and information through a user interface 1240 (displayed via a monitor 1260) by engaging input devices 1245 such as a tablet, electronic digitizer, a microphone, keyboard, and/or pointing device, commonly referred to as mouse, trackball or touch pad. Other input devices 1245 may include a joystick, game pad, satellite dish, scanner, or the like. Additionally, voice inputs, gesture inputs (e.g., via hands or fingers), or other natural user input methods may also be used with the appropriate input devices, such as a microphone, camera, tablet, touch pad, glove, or other sensor. These and other input devices 1245 are in operative connection to the processor 1202 and may be coupled to the system bus 1201, but may be connected by other interface and bus structures, such as a parallel port, game port or a universal serial bus (USB). The monitor 1260 or other type of display device may also be connected to the system bus 1201. The monitor 1260 may also be integrated with a touch-screen panel or the like.

The computing device 1200 may be implemented in a networked or cloud-computing environment using logical connections of a network interface 1203 to one or more remote devices, such as a remote computer. The remote computer may be a personal computer, a server, a router, a network PC, a peer device or other common network node, and typically includes many or all of the elements described above relative to the computing device 1200. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computing device 1200 may be connected to a public and/or private network through the network interface 1203. In such embodiments, a modem or other means for establishing communications over the network is connected to the system bus 1201 via the network interface 1203 or other appropriate mechanism. A wireless networking component including an interface and antenna may be coupled through a suitable device such as an access point or peer computer to a network. In a networked environment, program modules depicted relative to the computing device 1200, or portions thereof, may be stored in the remote memory storage device.

Certain embodiments are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example embodiments, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hard-wired), or temporarily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure the processor 1202, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

Computing systems or devices referenced herein may include desktop computers, laptops, tablets e-readers, personal digital assistants, smartphones, gaming devices, servers, and the like. The computing devices may access computer-readable media that include computer-readable storage media and data transmission media. In some embodiments, the computer-readable storage media are tangible storage devices that do not include a transitory propagating signal. Examples include memory such as primary memory, cache memory, and secondary memory (e.g., DVD) and other storage devices. The computer-readable storage media may have instructions recorded on them or may be encoded with computer-executable instructions or logic that implements aspects of the functionality described herein. The data transmission media may be used for transmitting data via transitory, propagating signals or carrier waves (e.g., electromagnetism) via a wired or wireless connection.

It should be understood from the foregoing that, while particular embodiments have been illustrated and described, various modifications can be made thereto without depart from the spirit and scope of the invention as will be apparent to those skilled in the art. Such changes and modifications are within the scope and teachings of this invention as defined in the claims appended hereto.

What is claimed is:

1. A method for improved cybersecurity named entity recognition, comprising:

categorizing, by a processor undiscovered keywords related to cybersecurity, including:

accessing an ambiguous keyword of a given sentence, the ambiguous keyword having multiple meanings and b elonging to one or more of a plurality of categories, calculating a plurality of semantic similarity scores by calculating a similarity score for each of the plurality of categories based on semantic similarity of the category and context of the ambiguous keyword within the given sentence, and assigning the ambiguous keyword to a specific category of the plurality of categories associated with a maximum score of the plurality of semantic similarity scores.

2. The method of claim 1, wherein the similarity score of an ambiguous keyword $w_i$ and a given category $c_j$ is defined as $Sim(w_i, c_j)$ and its range is [0,1].

3. The method of claim 1, wherein the similarity score (SemSim) of the given sentence S that contains an ambiguous keyword $x_i$ with a category $c_j \in C_i$ is defined as $$SemSim(S, x_i, c_j) = \frac{\sum_{a=1}^{k} Sim(n_a, c_j)}{k}.$$

4. The method of claim 1, further comprising:

identifying a specific category by, as follows:

$$SentCat(S, x_i, c) = \max_{c \in C_i} SemSim(S, x_i, c).$$

5. The method of claim 1, further comprising:

calculating the plurality of semantic similarity scores by implementing a model trained via a training corpus of cybersecurity entities and associated categories.

6. A tangible, non-transitory, computer-readable media having instructions encoded thereon, such that a processor, executing the instructions, is configured to:

access an ambiguous keyword of a given sentence, the ambiguous keyword having multiple meanings and belonging to one or more of a plurality of categories, calculate a plurality of semantic similarity scores by calculating a semantic similarity score for each of the plurality of categories based on semantic similarity of the category and context of the ambiguous keyword within the given sentence, and assign the ambiguous keyword to a specific category of the plurality of categories associated with a maximum score of the plurality of semantic similarity scores.

* * * * *